United States Patent [19]

Walter

[11] 3,907,582

[45] Sept. 23, 1975

[54] ASPHALT ROAD COMPOSITION AND PROCESS OF MAKING SAME

[76] Inventor: C. Edward Walter, 203 E. 39th St., Baltimore, Md. 21218

[22] Filed: Apr. 26, 1973

[21] Appl. No.: 354,917

Related U.S. Application Data

[63] Continuation-in-part of Ser. No. 263,170, June 15, 1972, abandoned.

[52] U.S. Cl............... 106/281 R; 106/280; 264/44; 404/81
[51] Int. Cl.² ..................... C08K 3/00; C08L 95/00
[58] Field of Search ............... 106/288 B, 280–284; 264/44, 37; 404/81

[56] References Cited
UNITED STATES PATENTS

| | | | |
|---|---|---|---|
| 1,237,920 | 8/1917 | Lovegrove et al................. | 106/281 |
| 1,237,921 | 8/1917 | Lovegrove et al................. | 106/281 |
| 1,936,810 | 11/1933 | Upson............................. | 264/44 X |
| 2,940,154 | 6/1960 | Howard........................... | 264/44 X |
| 3,206,319 | 9/1965 | Minnick et al.................... | 106/281 |
| 3,585,155 | 6/1971 | Hollstein........................ | 106/281 X |

*Primary Examiner*—Joan E. Welcome
*Attorney, Agent, or Firm*—Cushman, Darby & Cushman

[57] ABSTRACT

An asphaltic pavement course composition is disclosed, as well as process for making same. The composition utilizes, as the major ingredient, the residue from a refuse incinerator, which residue contains less than 5 percent, preferably less than 2 percent, by weight of ferrous material.

The low-ferrous content residue is combined in an asphaltic road base course composition or other asphaltic pavement course composition also containing asphalt and mineral aggregates, and optionally lime, to produce a pavement course material with excellent physical properties at low cost. Incinerator residues are a major source of environmental pollution, requiring the use of sanitary landfills to dispose of same, and the present invention reduces or even obviates the need of such landfills.

13 Claims, No Drawings

ASPHALT ROAD COMPOSITION AND PROCESS OF MAKING SAME

CROSS-REFERENCE TO RELATED APPLICATION

This is a continuation-in-part of my copending application Ser. No. 263,170, filed June 15, 1972, now abandoned.

BACKGROUND OF THE INVENTION

The first incinerator plant of record was built in Nottingham, England in 1874, and the first municipal incinerator in the United States was built in 1885 in Pennsylvania. A number of different incinerator designs were developed in subsequent years, but most of these early incinerators were generally less than satisfactory.

Significant advances in incineration have occurred since World War II, possibly as a result of changes in the average composition of municipal refuse. Incinerator advances include the use of mechanical stokers and continuous feed furnaces. The continuous or semi-continuous feed furnace has been accepted to the point that the construction of new plants involving batch feed incineration is a relatively rare occurrence except on quite small units.

Further developments in incineration include the use of slagging incinerators, which reduce the refuse to slag. The first slagging incinerator pilot plant in the United States was built in Massachusetts in 1966. Also, the incinerator art has investigated pyrolytic reduction to reduce refuse volumes prior to sanitary landfill disposal. The pyrolysis involves "burning" the refuse in the presence of less than a stoichiometric amount of oxygen, and even in the absence of oxygen, with the resulting chemical changes due primarily to the action of heat.

The prior art has attempted to economically utilize incineration products without serious environmental pollution. For instance, incineration reduces the weight of refuse, with the landfill space requirement of incinerated refuse being less than needed for landfill without incineration. The fly ash from incinerators is being recovered (note, e.g. *Public Works*, April, 1971, pages 77–81). Refuse recycling plants have been designed to convert refuse or trash into heat and products suitable for recycling (note, *Public Works*, April, 1971, p. 106).

Slags produced by slagging incinerators have been suggested for filling applications, such as road fill construction and road base (subbase) construction, and have even been suggested for incorporation, when suitably treated, as concrete aggregates (note, e.g. ASME publication 69-WA/Inc-1, "Incineration — Past, Present and Future," Stephenson, American Society for Mechanical Engineers, New York City, 1969). Pyrolytic reduction results in the production of a char which can be compressed into charcoal briquettes. Other applications for slags have been suggested, including spun insulation, foam insulation and various types of building materials.

Some municipal incinerator systems have treated the incinerator residues by magnetically separating ferrous materials therefrom, as the ferrous materials so recovered have an economic value. In most cases, however, the residue is not subjected to such magnetic separation of ferrous materials, and the entire residue is used in sanitary landfills.

To date, the prior art has not developed a satisfactory method of disposing of a residue from continuous feed incinerators. Such residues generally contain about 1 to 15 percent LOI (loss on ignition) and the specific composition of such residues will vary according to the refuse charged to the incinerator. Normally, a modern incinerator residue will have about 1.0–4.0 percent LOI and a specific gravity in the neighborhood of 2.5 or so, although the specific gravity may vary widely, e.g. from 2.0 to 3.0 or even less or more.

Asphalt roads have been used for quite some while in the United States. The first asphalt pavement was laid in New Jersey in 1870 and the first sheet asphalt pavement was laid with imported lake asphalt in Washington, D.C. in 1876. From this beginning, the production of asphalt has increased dramatically, with more than 24 million tons of asphalt and road oil produced in 1964.

When the term "asphalt" is used herein, reference is made to the asphalt described in "The Asphalt Handbook," The Asphalt Institute, College Park, Maryland, April, 1965 Edition, the disclosure of which is hereby incorporated by reference for the description of asphalt and asphalt road compositions therein.

Most asphalt roads are prepared by first preparing the subgrade, generally with considerable compaction thereof. A base course, generally an asphalt base course, which is a foundation course of mineral aggregate bound together with asphaltic material, is applied over the subcourse, if the subgrade soil is of adequate quality. Otherwise, a subbase is applied between the subgrade and the base course. In some applications, another base course or binder course is applied between the base course and the asphalt surface course. On top of the base course, or intermediate course, if one is used, an asphalt surface course, sometimes called an asphalt wearing course, is applied.

A typical asphalt road may consist of a crushed rock subbase and an asphalt base course, each about 8 inches thick, placed over a compacted subgrade. A surface course of hot mix asphaltic concrete is applied over the base course, with the surface course being about 2 inches thick.

Asphalt pavement courses are frequently applied over existing roads, either of the concrete or asphalt type. In repaving such existing roads, one or a plurality of asphalt courses may be applied. For instance, a 1 inch asphalt base course will frequently be laid over the existing road surface, followed by an additional 1 inch asphalt course normally designated a surface or wearing course.

Highway specifications are normally concerned with braking loads and reliance is primarily placed in stability tests, such as Hveem or Marshall. The asphalt content of the various asphaltic courses can be varied to change the stability test ratings of a composition but too rich an asphalt content introduces problems of rutting and shoving in the surface course, whereas too lean an asphalt content produces pavement composition with a tendency to crack.

Various types of aggregates have been used in asphalt base course compositions, surface course compositions, and the like. Each course of an asphalt road has different aggregate requirements. Mineral aggregates are normally used in such asphalt road compositions, with the mineral aggregates generally comprising 90 percent or more by weight of the asphalt road composition mix. The most commonly used mineral aggregates are crushed stone, slag, crushed or uncrushed gravel, sand and mineral filler.

Some attempts have previously been made to reduce environmental pollution by using certain environmental pollutants in asphalt road compositions. For instance, the April 3, 1972 edition of the *Washington Star* reported the use of discarded automobile tires in asphalt paving formulas, with the resulting mix overcoming "bleeding" or the oozing of asphalt on hot days, and reducing the rutting and ridging of the road caused by heavy traffic. Apparently, ground tires are used in the asphalt surface course. U.S. Pat. No. 1,364,621 suggests the use of blast furnace slag in an asphalt wearing surface. U.S. Pat. Nos. 3,206,319 and 3,585,155 disclose the use of fly ash in asphalt compositions.

A number of waste solids were tested for application as aggregates in highway pavement, including asphalt pavement, as reported by Bynum "Wasted Solids (Solid Waste) and Pavement Design" Public Works, pp. 56–60, November 1971. These laboratory test aggregates included tumbled beer bottles, ground rubber tires, scrap plastic, a combination of ground scrap tires and ground beer bottles, and DHM (dried horse manure). The use of tumbled beer bottles in an asphalt composition resulted in a composition whose fundamental mechanical properties were not as good as conventional asphaltic concrete using a siliceous aggregate. The use of ground rubber tires in the rubberized pavement improved the mechanical aging index. The use of 8 percent by weight of granulated plastic produced an increase of about 50 percent in the ultimate strain of the mix. The mixed scrap rubber tire-ground beer bottle asphaltic concrete produced apparently inconclusive results. The incorporation of DHM in an asphalt composition increased the ultimate stress 12 percent and increased the ultimate strain 45 percent.

SUMMARY OF THE INVENTION

The present invention includes asphaltic pavement course, especially road base course, compositions based upon using, as one of the aggregates therein, incinerator residue having the maximum particle size of less than about 2 inches, at most 15 percent LOI, and ferrous content of no more than 5 percent, preferably no more than 2 percent, by weight, and process for making same.

The composition also generally contains 5 to 11 percent, preferably 5 to 8 percent, by weight of asphalt, based on the weight of other components, 0 to 3 ¾ percent, preferably 1 ¼ to 3 ¾ percent, by weight of lime, and optionally mineral aggregate.

DESCRIPTION OF THE INVENTION

The present invention is directed to an asphalt pavement course composition which utilizes an otherwise environmental polluting material. The asphalt pavement course composition contains asphalt, and the residue from a refuse incinerator, which residue has been treated to remove oversize particles and to reduce the ferrous content thereof to at most 5 percent by weight, and optionally mineral aggregate and/or limestone.

The composition of municipal refuse incinerator residue is well known to those in the art. Typical compositions are disclosed in a United States Environmental Protection Agency publication entitled "Seven Incinerators" which reprints certain papers from the 1970 National Incinerator Conference, held on May 17–20, 1970 in Cincinnati, Ohio by the American Society of Mechanical Engineers, and in United States Department of the Interior, Bureau of Mines, Report of Investigations 7204, entitled "Composition and Characteristics of Municipal Incinerator Residues," December 1968, the disclosures of which are hereby incorporated by reference. The municipal refuse incinerator residues which are used in the present invention are in the substantially unfused or substantially unclinkered form. That is, the materials are received from the incinerator in a particulate form and not in a massive, clinkered form. If the residues meet the criteria set forth hereinbelow, there is no need for any further thermal treatment of same, which is a major advantage as compared to prior art processes for utilizing such residues.

As discussed hereinabove, trash incinerator residues have been available for a considerable length of time, and most of the trash incinerator residue which has been produced to date is merely quenched with water and then shipped to a landfill, being considered to have no economic value. In spite of the long history of the availability of trash incinerator residue, and the significant problems and costs that are encountered in the disposal of same, as well as the search by the prior art for alternative aggregates for various asphalt road course compositions, it has unexpectedly been found that incinerator residue, which has a particle size of less than 2 inches, a ferrous content less than 5 percent, preferably no greater than 2 percent by weight, and a LOI of no more than 15 percent by weight, preferably less than 10 percent by weight, is highly suitable for replacing about 50 percent or more, and even up to 100 percent, of the mineral aggregate in asphalt pavement course compositions. Significant costs have been associated with the disposal of incinerator residues, and the use of incinerator residues to replace part or even all of the mineral aggregate in the asphalt pavement course composition represents a significant economic advantage (stone, for instance, costs $3.00 to $4.00 per ton in many areas of the United States). More importantly, however, the asphalt pavement course composition produced according to the present invention, using incinerator residue having a ferrous content of less than 5 percent by weight, especially at most 2 percent by weight, results in a composition which has improved properties over some of the conventional compositions heretofore used. For instance, the asphalt pavement course composition of the present invention requires as little as 5 ½ percent or so of asphalt, whereas blast furnace slag mixes generally require at least 10 or 12 percent of asphalt in the composition.

The compositions of the present invention are cheaper than commercially used blast furnace slag road base compositions, and the compositions of the present invention have more body and are stronger than similar compositions, containing the same amount of asphalt binder, based on blast furnace slag.

The residue from batch incinerators is not as uniform as that from continuous feed incinerators, and also generally has a higher loss on ignition (LOI). For this reason, the batch incinerator residue must be analyzed for suitability more closely than the residue from a continuous grate or a continuous feed incinerator. Asphalt pavement course compositions may be produced from the residue from batch incinerators, with the residue having been treated to generally limit maximum particle size and to lower the ferrous content thereof as described hereinafter, but it is greatly preferred to use the residue from a continuous feed incinerator.

The incinerator residue is normally recovered in a substantially unfused or unclinkered, particulate form whose size varies widely depending upon the particular incinerator and the composition of the incinerator feed. The incinerator residue is subjected to particle size and/or magnetic separation to reduce the maximum particle size to less than 2 inches, generally about 1 inch or 1 ½ inches or so, as desired in the particular asphaltic pavement course mix, and to reduce the ferromagnetic content to less than 5 percent, preferably less than 2 percent, by weight. When the asphalt composition is to be used as a surface or wearing course, it is normally preferable to utilize a maximum particle size of the treated residue of about three-fourths inch, in order to obtain a smooth, uniform appearance of the surface thereof. It may be possible to achieve adequate ferromagnetic material separation as part of particle size separation, but a subsequent magnetic separation step may be required, depending upon the particular incinerator and the average composition of the incinerator feed. If the ferrous material is not removed from the incinerator residue, it is likely that the resulting asphalt road base course will fail, due to oxidation of the ferromagnetic material, and/or due to the fact that untreated residue contains ferrous material which has been oxidized, with the oxidation product adversely effecting the adhesion of the asphalt to the ferrous material, causing a resulting collapse or expansion of the base course. For simplicity, the incinerator residue from which the ferromagnetic material has been at least partly separated so that the residue contains less than 5 percent by weight of ferromagnetic material, will be referred to hereinafter as "treated residue."

An additional possible benefit which can be obtained from ferromagnetic metal separation is that the ferromagnetic material separated from the incinerator residue may be recycled, such as, e.g., to a steel mill to practically eliminate, when used in conjunction with the present invention, the necessity of incinerator residue disposal. Any recycling of or reclamation of separated ferromagnetic materials may or may not require additional processing after separation thereof from the incinerator residue, but such processing is not part of the present invention.

In the asphalt pavement course composition, the treated residue is used to replace sand, stone, or other conventional siliceous aggregates. In order to produce acceptable compositions, the treated residue must have a loss on ignition (LOI) of at most 15 percent by weight, preferably no more than 10 percent.

While relatively minor amounts of the treated residue may be used, e.g., 30 or 20 or even 5 or 10 percent by weight, it is generally desirable to use as much of the treated residue as possible, both to reduce environmental pollution and to lower the cost of the pavement course composition. For certain asphalt pavement course compositions, it is possible to replace up to 100 percent of the mineral aggregate. The determination of the amount of mineral aggregate which is to be replaced by treated residue in a given asphalt pavement course mix according to the present invention generally depends upon a number of variables, including environmental pollution and the reduction thereof by utilizing the treated residue, the cost of producing and the nature of the treated residue, the cost of mineral aggregates which may vary considerably depending upon the particular type and locality, the cost of the asphalt, the amounts of treated residue available, and similar considerations. In general, the amount of asphalt, which is generally the most expensive ingredient required for a given mix, increases as the treated residue is used in amounts in excess of 40–55 percent by weight. For this reason, if the treated residue cost is competitive with the cost of mineral aggregates, the lowest overall mix cost is generally obtained using about 40–55 percent by weight of the treated residue in the mix, although, as noted above, other considerations may dictate the use of greater amounts of the treated residue. For the above reasons, therefore, it is preferred that the treated residue content of the pavement course competition be generally in the range of 40–55 percent by weight, more preferably about 50 percent by weight, if the residue is treated as described above.

If amounts of the treated residue used in the pavement course mix are greater than the aforesaid range of 40–55 percent by weight, it may be necessary, depending upon the nature of the particular incinerator residue, to subject the treated residue to additional crushing and/or gradation. For instance, the treated residue may be divided into a portion passing a three-eighths inch screen or sieve and the portion retained thereon. The use of treated residue of a smaller particle size generally allows greater amounts thereof to be used as replacement for mineral aggregate, with amounts as high as 70 or even 80 percent by weight being feasible. Incinerator residues vary widely, depending upon the character of the incinerator feed and the incineration process and apparatus, and in some instances as much as 100 percent by weight of the mineral aggregate can be replaced by treated residue.

The asphalt pavement course composition will contain from 5 to 10 percent, preferably 5 to 8 percent, by weight of asphalt, most preferably about 5½ percent by weight of asphalt. Any of the asphalts identified in "The Asphalt Handbook" cited hereinabove, as suitable for use in road pavement compositions may be utilized in the practice of the present invention, with the selection of a specific asphalt being determined by the specific design mix, as known to those in the art. The compositions of the present invention are preferably used as road base course compositions, but may be used in other pavement courses, including surface or wear courses.

It is preferred in some instances to include about 1¼ to 3¾ percent by weight or so of lime in the pavement course composition of the present invention, preferably about 2½ percent by weight of lime. The addition of hydrated lime within the aforesaid ranges results in an increased adhesion of the binder to any glass particles in the treated residue (i.e., the hydrated lime acts as an antistripping agent), and the addition of hydrated lime also increases stability of the pavement course. The lime may also be conveniently added in the form of ground limestone, such as limestone ground to not less than 95 percent passing a No. 200 sieve. The limestone is added to increase stability of the road base course.

The remainder, if any, of the asphalt road pavement course composition not replaced by treated aggregate is generally siliceous aggregate, with the siliceous aggregate being any of the aggregates normally used in asphalt pavement compositions, especially those aggregates identified hereinbelow. Different sizes of aggregates may be used, as known to the art, to produce desired effects. For instance, a portion of the mineral aggregate may be sand, with the remainder of the aggregate being stone, of either one or a plurality of screened sizes. It is also possible to replace all or a part of the siliceous aggregate with other aggregates, such as blast furnace slag, although this is not preferred. Conventional additives, such as rubber, asbestos, DHM, etc., can be added to improve stability, increase or decrease flow, or the like, as known to the art.

It must be noted that the steps of heating, drying and mixing which occur in a hot mix asphalt plant function to improve the characteristics of treated residue. The dryer or heater may burn out most of the remaining combustible material existing in treated residue. In addition, the mixing and coating of each particle with asphaltic cement at least partially seals each particle, thus reducing the oxidation of ferrous material as well as reducing or even stopping anaerobic decay of putrescible material. The action of the dryer also tends to reduce anaerobic decay of putrescibles by sterilizing putrescible materials.

The asphalt pavement course composition is mixed together and applied to the subcourse or subbase, as the case may be, of the road or other asphalt pavement application, including parking lots, driveways, etc., by methods known to the art, such as those described in The Asphalt Handbook. Generally, the treated residue will be subjected to a drying or other heating step, as is conventional in the treatment of mineral aggregate in the asphalt plant. The asphalt will be heated, of course, to the point that an adequate flow is obtained.

In some instances, satisfactorily treated incinerator residue suitable for use in asphaltic pavement compositions may be obtained by simple trommeling, if the trommel holes are no greater than 1½ inches in diameter, preferably about 1 inch in diameter. Using these trommel hole sizes, satisfactory reduction in the residue ferrous content and combustible content generally occurs, and no further treatment is required before introducing the treated residue so obtained into the cold feed of an asphalt plant. A trommel is preferred for size gradation over vibrating screen or the like, as wires tend to be retained in the trommel but passed by vibrating screens. However, with the smaller trommel hole size, some residue material will be retained in the trommel which could be utilized in the asphaltic pavement composition. A small trommel hole generally reduces the amount of combustible or putrescible material which is frequently found in the residue of old or improperly operated incinerators. (Note Example 2 hereinbelow, wherein the use of a screen with a hole size of 1 inch reduced the combustible content of the residue from about 14 to 6 percent by weight.) A 1 inch diameter trommel hole will generally exclude bottle caps which would be considered undesirable in certain asphaltic pavement compositions because of the shape thereof or for aesthetic reasons. The bottle caps do not, however, appear to adversely affect the strength or durability of the compositions if the overall ferrous content is within the ranges described above.

After trommeling the incinerator residue it may be desirable or even necessary to further reduce the ferromagnetic content thereof, depending upon the specific incinerator feed and incinerator operation. Generally, however, additional ferromagnetic material removal only serves to increase the acceptability of the residue to those in the art accustomed to using mineral aggregates.

Ferromagnetic recovery from incinerator residues is now practiced as part of several incinerator installations, and the practice of ferromagnetic recovery is growing. As mentioned above, it may be desired or even necessary to reduce the ferrous content of the residue passing through a trommel or similar device. The residue ferrous content reduction may be particularly desirable if large trommel holes are used to maximize the recovery of treated residue, suitable, except for ferrous content, for use in asphaltic pavement compositions. The residue ferrous content reduction can be economically accomplished by passing the trommeled residue over a conventional magnetic belt separator.

In conventional asphaltic pavement compositions, the mineral aggregates are often used in specified, distinct size fractions or gradings. Suitable fractionation of the treated residue may be easily accomplished by conventional screening, if such fractionation is desired.

The moisture content of the treated residue is often high as typical incinerator practice is to quench or spray the incinerator residue with water to reduce the temperature thereof as the residue falls from the burning grate. The drying step of a conventional asphalt plant will normally satisfactorily remove this moisture, but if the moisture content of the treated residue is extremely high, it may be found desirable to subject the treated residue to a predrying step. The use of such a predrying step also generally reduces the amount of combustible material in the treated residue. (Note, e.g., Example 2, hereinbelow, wherein the combustible material content was reduced by the drying step from about 6.0 to about 0.7 percent). Elimination of any predrying step only results in a heavier load imposed upon the anti-air pollution devices of the asphalt plants, as modern asphalt plant dryers can readily accomplish the desired reduction of moisture content.

In general, the treated residue which is suitable for use in the asphaltic pavement compositions of the present invention will be half or more of the total incinerator residue, and thus represent a significant reduction in landfill requirements or the like.

EXAMPLES OF THE INVENTION

EXAMPLE 1

The incinerator residue from the Alexandria, Virginia, incinerator was subjected to a size and magnetic separation of ferromagnetic materials, and the treated residue contained about one-half percent weight of the ferromagnetic material. This treated residue had a specific gravity of 2.50 and LOI of 1.3 percent. A mix containing 50 percent of the treated residue, 20 percent sand, 10 percent No. 10 stone, 17.5 percent No. 4 stone and 2.5 percent lime was produced from raw materials which had the following sieve analysis, wherein the values reported are the percent of the raw material passing the indicated sieve:

| Sieve No. | Particle Sizes of Raw Materials | | | | |
|---|---|---|---|---|---|
| | Hydrated Lime | Sand | No. 4 Stone | No. 10 Stone | Incinerator Residue |
| 1½" | | | | | 100 |
| ¾" | | | 100 | | 91 |
| ⅜" | | 100 | 46 | 100 | 41 |
| 4 | | 98 | 16 | 94 | 16 |
| 8 | | 91 | 6 | 81 | 10 |
| 16 | | 81 | 4 | 65 | 5 |
| 50 | 100 | 26 | 3 | 37 | 2 |
| 200 | 95 | 1 | 2 | 11 | 0.5 |
| Specific Gravity | 2.20 | 2.63 | 2.70 | 2.90 | 2.50 |

The asphalt cement had the following properties:

| | |
|---|---|
| Specific gravity | 1.03 |
| Penetration at 77° F. | 94 |
| Kinematic Viscosity at 275° F. | 456 Centistokes |
| Absolute Viscosity at 140° F. | 2059 Poises |
| Solubility in CS$_2$ | 99.9% |
| Ductility at 77° F. | 100+ cms. |

Mixes were made using 5.0, 5.5, 6.0 and 6.5 percent asphalt content, based on the weight of the other components, to determine optimum stability. Plugs were made of each asphalt mix, in order to obtain information for plotting Marshall curves, in order to compare the results with the established Marshall Criteria of "Baltimore City Specifications for Material, Highways, Bridges, Utilities, and Incidental Structures," amendment No. 4, issued July, 1971 and "Mix Design Methods For Asphalt Concrete and Other Hot Mix Types;" Second Edition; February, 1962; Asphalt Institute. The following data was obtained from the Marshall tests, with all values reporting the average of three specimens:

| Bitumen (%) | 5.0 | 5.5 | 6.0 | 6.5 |
|---|---|---|---|---|
| Marshall Stability (lbs.) | 1230 | 1390 | 1330 | 1170 |
| Flow (1/100 in.) | 12 | 13 | 14 | 13 |
| Air Voids (%) | 4.3 | 3.4 | 2.4 | 1.0 |
| Wt. Per Cu. Ft. (lbs.) | 142.8 | 144.1 | 144.1 | 145.2 |
| Voids in Mineral Aggregate (%) | 15.4 | 15.7 | 15.9 | 15.7 |
| Voids Filled with A.C. (%) | 72.8 | 78.8 | 84.8 | 93.5 |

Based on the above data, it is clear that the preferred asphalt content is about 5.5 percent by weight for the composition treated. At this point, all of the Marshall Criteria are satisfied, with the stability in excess of 500 lbs. flow between 8 and 18, air voids between 3 and 8 percent, voids in mineral aggregate in excess of 13 percent, and voids filled with asphalt content between 65 and 85 percent.

The compositions of the present example, especially the composition having an asphalt content of 5.5 percent by weight, were highly suitable for use as an asphalt road base course composition.

The Alexandria, Virginia incinerator residue has the following composition:

| | |
|---|---|
| Fines including unburned combustibles | 52.5% |
| Metal | 14.6% |
| Glass | 32.9% |

A typical analysis of the Alexandria, Virginia incinerator residue would have the following, more detailed analysis:

| | |
|---|---|
| Massive iron and wire | 7.6% |
| +4-mesh magnetics (primarily cans) | 16.8% |
| −4 mesh plus 20-mesh magnetics | 11.0% |
| Non-ferrous metals | 3.4% |
| Magnetic glass | 14.4% |
| Non-magnetic glass | 27.1% |
| Classifier sands | 16.2% |
| Filter cake | 3.0% |
| Unburned | 0.5% | wherein all of the above percentages are by weight.

EXAMPLE 2

A field test involving about 10 tons of asphaltic base course composition was laid on Harford Road in Baltimore, Maryland, on July 12, 1972, based on treated residue from a 40-year old batch-type incinerator located in Baltimore, Maryland (Incinerator No. 3). The incinerator residue was subjected to particle sizing to remove particles larger than 1 inch in diameter, with the particle sizing operation reducing the LOI from 14 to 3.8 percent, and reducing the ferromagnetic material content of the treated residue to less than 4 percent by weight.

The raw materials used in this Example had the following sieve anaylsis:

| Sieve No. | Percent Passing Raw Materials | | | | |
|---|---|---|---|---|---|
| | Hydrated Lime | Sand | No. 4 Stone | No. 10 Stone | Treated Residue |
| 1½" | | | | | 100 |
| ¾" | | | 100 | | 100 |
| ⅜" | | 100 | 57 | 100 | 64 |
| 4 | | 98 | 17 | 94 | 31 |
| 8 | | 91 | 6 | 81 | 21 |
| 16 | | 81 | 3 | 65 | 15 |
| 50 | 100 | 26 | 2 | 37 | 8 |
| 200 | 95 | 1 | 1 | 11 | 3 |
| Specific Gravity | 2.20 | 2.63 | 2.82 | 2.82 | 2.50 |
| Loss of Ignition | — | — | — | — | 6.0% |

Using the above raw material, a composition containing 50 percent of treated residue, 20 percent sand, 10 percent No. 10 stone, 17.5 percent No. 4 stone and 2.5 percent lime, was used as the base mix in laboratory testing to determine optimum asphalt content. The basic mix was used with 5.5, 6.0, 6.5 and 7.0 percent asphalt, based on the weight of the basic mix (the asphalt was the same as used in Example 1), in tests to determine optimum composition stability, with the following Marshall data obtained.

| | Marshall Method Design Data | | | |
|---|---|---|---|---|
| Bitumen (%) | 5.5 | 6.0 | 6.5 | 7.0 |
| Marshall Stability (lbs.) | 775 | 885 | 1015 | 840 |
| Flow (1/100 in.) | 13.0 | 17.0 | 16.7 | 18.0 |
| Wt. per Cu. Ft. (lbs.) | 132.2 | 135.3 | 136.8 | 134.5 |
| Air Voids (%) | 11.6 | 8.8 | 7.3 | 7.0 |

-continued

| | Marshall Method Design Data | | | |
|---|---|---|---|---|
| Voids in Mineral Aggregate (%) | 22.9 | 21.5 | 21.1 | 21.8 |
| Voids Filled with A. C. (%) | 49.4 | 58.9 | 65.6 | 68.0 |

Based on the above data, the asphalt content of 6.5 percent by weight was indicated to be preferred. It will be noted that this amount of asphalt is greater than that used in Example 1, which had a similar proportion of treated residue. The higher asphalt requirement is believed due to the generally smaller particle size of the raw materials of this Example and the greater particle size gradation.

Ten tons of asphaltic road base course composition were prepared, using the 6.5 percent by weight asphalt content, in a conventional asphalt plant (wherein the LOI of the residue was reduced to 0.7 percent by weight in the aggregate dryer). The field test strip was installed with conventional equipment. After installation, samples were taken and analyzed, with the following Marshall data obtained.

| | Marshall Data | |
|---|---|---|
| | Plug No. 1 | Plug No. 2 |
| Stability (lbs.) | 910 | 975 |
| Flow (1/100 in.) | 10 | 10 |
| Wt. per Cu. Ft. (lbs.) | 144.2 | 143.1 |
| Air Voids (%) | 2.9 | 3.0 |

The above data generally meets the Marshall test tolerances of a stability above 500 pounds, a flow of 8–18 and from 3–8 percent air voids.

EXAMPLE 3

Treated residue was obtained by subjecting incinerator residue from Incinerator No. 3, Baltimore, Maryland, to size and ferromagnetic material separation (magnetic separation was utilized). The treated residue contained about 0.5 percent by weight of ferromagnetic material. The raw materials used in this Example had the following sieve analysis, with the reported values being the percent of raw material passing the indicated sieve:

| | Particle Size of Raw Material | | | | |
|---|---|---|---|---|---|
| Sieve No. | Hydrated Lime | Sand | No. 4 Stone | No. 10 Stone | Treated Residue |
| 1½" | | | | | 100 |
| ¾" | | | | 100 | 94 |
| ⅜" | | | 100 | 57 | 100 | 73 |
| 4 | | 98 | 17 | 94 | 54 |
| 8 | | 91 | 6 | 81 | 43 |
| 16 | | 81 | 3 | 65 | 35 |
| 50 | 100 | 26 | 2 | 37 | 16 |
| 200 | 95 | 1 | 1 | 11 | 5 |
| Specific Gravity | 2.20 | 2.63 | 2.82 | 2.82 | 2.50 |
| Loss of Ignition | | | | | 6.9% |

The asphalt had the following properties:

| | |
|---|---|
| Specific gravity | 1.03 |
| Penetration at 77° F. | 94 |
| Kinematic Viscosity at 275° F. | 456 Centistokes |
| Absolute Viscosity at 140° | 2059 Poises |
| Solubility in $CS_2$ | 99.9% |
| Ductility at 77° | 100+cms. |

Various mixes were made varying both the treated residue content and the asphalt content, starting with 100 percent treated residue (other than asphalt). The amount of treated residue was reduced stepwise, with the sand, stone and lime used to replace the treated residue (these raw materials were used in relative proportions set forth in Example 2). The optimum asphalt contents were determined as follows:

Tabulation of Treated Residue and Optimum Asphalt Content Based on above Marshall Data

| Treated Residue | Optimum Asphalt Content |
|---|---|
| 100% | 9.5% |
| 97.5% | 9.5% |
| 90% | 9.0% |
| 80% | 8.5% |
| 70% | 8.0% |
| 60% | 7.5% |
| 50% | 6.0% |
| 40% | 6.0% |
| 30% | 6.0% |
| 20% | 5.5% |
| 10% | 5.5% |

The Marshall data obtained on the mix using 100 percent treated residue in the cold feed was as follows:

| Bitumin (%) | 9.0 | 9.5 | 10.0 | 10.5 |
|---|---|---|---|---|
| Marshall Stability (lbs.) | 1060 | 1070 | 1055 | 970 |
| Flow (1/100 in.) | 16.3 | 17.3 | 20.7 | 22.0 |
| Wt. per Cu. Ft. (lbs.) | 123.8 | 124.4 | 124.6 | 126.0 |
| Air Voids (%) | 10.4 | 9.6 | 8.6 | 7.2 |
| Voids in Mineral Aggregate (%) | 27.1 | 27.9 | 28.0 | 27.9 |
| Voids Filled with A. C.(%) | 64.1 | 65.9 | 69.3 | 74.7 |

From the above data, it appears that above a treated residue content of about 40–50 percent by weight, the optimum asphalt content increases with increased treated residue content. Asphalt is the single most expensive ingredient used in asphaltic mixes and it is generally considered proper design practice to attempt to minimize the asphalt content. From the above data, it would appear that 5½–6½ percent by weight of asphalt and 40–55 percent by weight of treated residue is the optimum combination used in connection with mineral aggregates, for the lowest cost mix. It should be appreciated, however, that the present invention is concerned with environmental factors as well as base cost factors, and other amounts of asphalt and/or treated residue may be chosen to offer the greatest environmental benefit.

EXAMPLE 4

Incinerator residue from the municipal incinerator of Tonawanda, New York, was subjected to size and magnetic separation, with the treated residue obtained utilized in an asphaltic pavement surface course composition. This example relates to the preparation of a SN Surface Course (Baltimore City designation).

The treated residue had a ferromagnetic material content of 4.5 percent by weight and the raw materials had the following sieve analysis:

Particle Sizes of Raw Materials

| Sieve No. | No. 10 Stone | Hydrated Lime | Treated Residue |
|---|---|---|---|
| ¾" | 100 | | 100 |
| ⅜" | 100 | | 93 |
| 4 | 93 | | 61 |
| 8 | 86 | | 41 |
| 16 | 59 | | 29 |
| 30 | 47 | | 19 |
| 50 | 34 | 100 | 12 |
| 100 | 21 | 97 | 7 |
| 200 | 11 | 95 | 4 |
| Specific Gravity | 2.75 | 2.20 | 2.36 |

The asphalt of Example 3 was used in this Example. The optimum stability asphalt content was determined based on mixes using 6.0, 6.5, 7.0 and 7.5 percent asphalt content, with the following Marshall data obtained (all values represent the average of 3 tests):

MARSHALL METHOD DESIGN DATA

Cold Feed: 50% Treated Residue, 48.75% No. 10 Stone, 1.25% Lime
Mix Designation: SN (Surface Course)

| Bitumen (%) | 6.0 | 6.5 | 7.0 | 7.5 |
|---|---|---|---|---|
| Marshall Stability (lbs.) | 1480 | 1580 | 1460 | 1280 |
| Flow (1/100 in.) | 11.0 | 12.3 | 14.3 | 15.0 |
| Wt. per Cu. Ft. (lbs.) | 139.3 | 140.2 | 137.0 | 136.0 |
| Air Voids (%) | 3.8 | 2.5 | 2.0 | 0.6 |
| Voids in Mineral Aggregate (%) | 17.1 | 17.1 | 19.4 | 17.5 |
| Voids Filled with A.C. (%) | 78.2 | 85.3 | 92.0 | 97.9 |

Based on the above data, the preferred asphalt content appears to be 6.0 percent by weight, with this asphalt content satisfying all of the Marshall data criteria (see, e.g., Baltimore City Specifications for Material, Highways, Bridges, Utilities, and Incidental Structures; Amendment No. 4, July, 1971).

Asphalt pavement surface courses are subjected to abrasive wear, and obviously such surface courses must be durable to such wear. The treated incinerator residue of this Example was tested for abrasive wear, using the ASTM procedures of the Los Angeles Abrasion Test, with the following results:

| Grading "A" | Insufficient large material to test |
|---|---|
| Grading "B" | 35% loss |
| Grading "C" | 33% loss |
| Grading "D" | 33% loss |

The Baltimore City specifiction identified above specifies that surface courses shall have less than 40 percent loss, and it will be readily appreciated that the compositions of the present Example were highly suitable for use as an asphalt pavement surface course.

What is claimed is:

1. An asphaltic pavement course composition consisting essentially of from about 5 to about 95 percent by weight of said composition of substantially unfused and substantially unclinkered continuous feed municipal incinerator residue, said residue having at most 15 percent LOI, a maximum particle size of less than about 2 inches, and a ferrous content no more than 5 percent by weight, from 0 to 3¾ percent by weight of said composition of lime and 0–90 percent by weight of mineral aggregate having a maximum average diameter of 1½ inches, and from 5 to 11 percent by weight of asphalt, said asphalt based on the weight of the other components in said composition.

2. An asphaltic road base course composition consisting essentially of from about 5 to about 80 percent by weight of said composition of substantially unfused and substantially unclinkered continuous feed municipal incinerator residue, said residue having at most 15 percent LOI, a maximum particle size of less than about 2 inches, and a ferrous content no more that 2 percent by weight, from 1¼ to 3¾ percent by weight of said composition of lime and remainder mineral aggregate having a maximum average diameter of 1½ inches, and from 5 to 11 percent by weight of asphalt, said asphalt based on the weight of the other components in said composition.

3. Composition of claim 2, wherein said composition contains 40–55 percent by weight of said residue.

4. Composition of claim 3, wherein said residue has less than 10 percent by weight LOI.

5. Composition of claim 3, wherein said composition contains about 5½ percent by weight of asphalt.

6. Composition of claim 5, wherein said composition contains about 2½ percent by weight of lime.

7. Composition of claim 3, wherein said incinerator residue has a maximum particle size of about 1 inch to about 1½ inches.

8. Composition of claim 1, wherein said composition contains up to about 80 percent by weight of said composition of incinerator residue.

9. Composition of claim 8, wherein said residue has a ferrous content no more than 2 percent by weight.

10. A process for making an asphaltic road course composition, said process comprising removing oversize particles and/or ferrous material from substantially unfused and substantially unclinkered continuous feed municipal incinerator residue having at most 15 percent LOI to produce a product having a ferrous content of less than 5 percent by weight and a maximum particle size of less than 2 inches, and thereafter incorporating said product into an asphaltic road pavement course composition containing from 5 to 95 percent by weight of said product, 0 to 3¾ percent by weight of lime, and 0 to 90 percent by weight of mineral aggregate, and from 5 to 11 percent by weight of asphalt, said asphalt based on the weight of the other components in said composition.

11. A process for making an asphaltic road base composition, said process comprising removing oversize particles and/or ferrous material from substantially unfused and substantially unclinkered continuous feed municipal incinerator residue having at most 15 percent LOI to produce a product having a ferrous content of less than 2 percent by weight and a maximum particle size of less than 2 inches, and thereafter incorporating said product into an asphaltic road base course composition containing from 5 to 80 percent by weight of said product, 1¼ to 3¾ percent by weight of lime, and remainder mineral aggregate, and from 5 to 11 percent by weight of asphalt, said asphalt based on the weight of the other components in said composition.

12. Process of claim 11, wherein said residue has less than 10 percent LOI.

13. Process of claim 11, wherein said product is present in said composition in an amount of about 50 to 55 percent by weight.

* * * * *